United States Patent
Moestrup et al.

(10) Patent No.: US 9,127,650 B2
(45) Date of Patent: Sep. 8, 2015

(54) TOWER ASSEMBLY SYSTEM FOR WIND TURBINES AND METHOD THEREOF

(71) Applicant: Envision Energy (Denmark) ApS, Silkeborg (DK)

(72) Inventors: Henning Moestrup, Viborg (DK); Jan Westergaard, Brande (DK)

(73) Assignee: Envision Energy (Denmark) APS, Silkeborg (DK)

(*) Notice: Subject to any disclaimer, the term of this patent is extended or adjusted under 35 U.S.C. 154(b) by 0 days.

(21) Appl. No.: 14/185,389

(22) Filed: Feb. 20, 2014

(65) Prior Publication Data

US 2014/0237932 A1 Aug. 28, 2014

(30) Foreign Application Priority Data

Feb. 26, 2013 (DK) .................................. 2013 70107

(51) Int. Cl.
| | |
|---|---|
| E03D 11/04 | (2006.01) |
| F03D 11/04 | (2006.01) |
| F03D 1/00 | (2006.01) |
| E04H 12/00 | (2006.01) |
| E04H 12/34 | (2006.01) |

(52) U.S. Cl.
CPC ................ F03D 11/04 (2013.01); E04H 12/00 (2013.01); E04H 12/342 (2013.01); F03D 1/001 (2013.01); Y02E 10/728 (2013.01)

(58) Field of Classification Search
CPC ....... F03D 11/04; F03D 1/001; Y02E 10/728; Y10T 29/53978
USPC ............... 52/741.18, 741.17, 651.01, 651.07, 52/173.1, 40, 848, 223.5
See application file for complete search history.

(56) References Cited

U.S. PATENT DOCUMENTS

| | | | | |
|---|---|---|---|---|
| 3,469,299 | A * | 9/1969 | Rogers ............................ | 29/256 |
| 4,189,892 | A * | 2/1980 | Smith .......................... | 52/749.1 |
| 8,646,219 | B2 * | 2/2014 | Lyness ............................. | 52/40 |
| 2009/0211174 | A1 * | 8/2009 | Henderson et al. ............... | 52/40 |
| 2010/0307097 | A1 * | 12/2010 | Word et al. ............... | 52/651.07 |

FOREIGN PATENT DOCUMENTS

| | | |
|---|---|---|
| GB | 2483677 A | 3/2012 |
| WO | WO 2012/083831 A1 | 6/2012 |

OTHER PUBLICATIONS

Search Report prepared by the Danish Patent and Trademark Office on Oct. 17, 2013, for Application No. PA 2013 70107.

* cited by examiner

*Primary Examiner* — Jeanette E Chapman
*Assistant Examiner* — Daniel Kenny
(74) *Attorney, Agent, or Firm* — Sheridan Ross P.C.

(57) ABSTRACT

The present invention relates to a tower assembly system, a method of assembling a wind turbine tower and a wind turbine thereof. Three or more guidance devices may be mounted to a mounting flange in the upper end of a lower tower section and/or in the lower end of an upper tower section. The guidance device comprises a contact surface for contacting a mating contact surface on the opposite tower section. The guidance device comprises a mounting flange for mounting the device to the mounting flange of the tower section using fastening means. This allows the guidance devices to catch and guide the free hanging tower section into the correct position on the stationary tower section. This enables the assembly time to be reduced with up to 50% compared with the present assembly methods. The guidance devices allow the workers to guide the free hanging tower section into position from the ground.

7 Claims, 8 Drawing Sheets

TOWER ASSEMBLY SYSTEM FOR WIND TURBINES AND METHOD THEREOF

CROSS-REFERENCE TO RELATED APPLICATIONS

This application claims the benefit of Danish Patent Application No. PA 2013 70107 filed on Feb. 26, 2013, the entire contents of which are incorporated herein by reference.

FIELD OF THE INVENTION

The present invention relates to a tower assembly system for a wind turbine, where the system comprises:
- a first tower section having a first upper end connected to a first lower end facing away from the first upper end, wherein the first lower end comprises a first flange having multiple first holes configured to receive fastening means for mounting to a second tower section, and comprises a first contact surface for contacting a second contact surface on the tower section;
- the second tower section having a second upper end connected to a second lower end facing away from the second upper end, wherein the second upper end comprises the second contact surface and a second flange having multiple second holes configured to receive the fastening means.

The present invention also relates to a method of assembling a wind turbine tower, where the method comprising the steps of:
- lifting a first tower section having a first lower end in at least an axial direction relative to a second tower section having a second upper end so that the first lower end is positioned above the second upper end;
- substantially aligning the first tower section relative to the second tower section in the axial direction so that the first lower end is substantially positioned above the second upper end;
- lowering the first tower section in the axial direction relative to the second tower section until a first contact surface on the first lower end is brought into contact with a second contact surface on the second upper end;
- guiding the first tower section into position on the second tower section in which the first lower end of the first tower section rests on the second upper end of the second tower section.

The present invention furthermore relates to a wind turbine comprising:
- a wind turbine tower comprising two or more tower sections which are configured to be coupled together, wherein the uppermost tower section forms a top of the wind turbine;
- a nacelle provided on top of the wind turbine tower;
- a rotor hub rotatably mounted to the nacelle;
- one or more wind turbine blades mounted to the rotor hub, wherein the wind turbine blades form a rotor plane.

BACKGROUND OF THE INVENTION

Today large wind turbines for onshore or offshore use have become so large and heavy that they are manufactured and assembled in sections. A wind turbine today typically comprises a wind turbine tower with a height of at least 50 m, a nacelle coupled to the top of the wind turbine tower in which the generator is located, a rotor hub coupled to the generator via a rotor shaft, and two or three wind turbine blades coupled to the rotor hub. These pieces are typically manufactured separately and transported to the installation site or pre-assembled in units. The pieces or the pre-assembled units are then lifted into position and assembled using one or more cranes at the installation site.

A wind turbine tower is typically manufactured in a number of tower sections which are easier to handle and to transport out to the installation site. The individual pieces of a wind turbine are typically assembled using a large crane and a small crane. The large crane is coupled to the upper part of a tower section while the small crane is coupled to the lower part of that tower section. The two cranes then work together for positioning the latter tower section over a former tower section. Workers then guide the latter tower section, as it is lowered, so that it is positioned correctly on the former tower section. In order to guide the latter tower section into its correct position, the workers have to be situated inside the former tower section at the top. As the latter tower section is lowered, the workers push and pull on the large and heavy structure in order to manoeuvre it into position. This often means that they have to place their body or arm in between the contact surfaces of the two tower sections, thus creating a dangerous situation for the workers as long as the latter tower section hangs freely in the air. As the latter tower section is able to move freely until it is positioned firmly on the former tower section, it may scrape off the sealant located on the contact surface of the former tower section. This also means that the assembly process is not carried out in wind speeds above 10 m/s.

WO 2012/075607 A1 discloses a method of assembling a wind turbine tower which solves this problem by using a system of guide wires extending between two tower sections. Before lifting the latter tower section into position over the former tower section, two guide wires are threaded through a top flange and a bottom flange in the latter tower section and through a top flange in the former tower section. The guide wires are secured to a stop element at the free end and a pulley located on the crane boom ensured that the latter tower section is vertically aligned with the former tower section when the guide wires are tensioned using the winches located on the ground. This enables the workers to be situated outside the wind turbine tower when the latter tower section is lifted and lowered into position on top of the former tower section.

The system of guide wires complicates the assembly process and increases the assembly time as the guide wires first have to be threaded through the respective holes in the flanges in the two tower sections. This increases the risk of the guide wires becoming entangled during the initial phase of the assembly process, and the risk of a misalignment of the two tower sections if the guide wires are threaded through the same opposite facing holes in the respective flanges. Before a new tower section or the nacelle can be lifted and lowered into position on top of the latter tower section, the guide wires first have to be unthreaded and removed from the structure. This added step increases the total assembly time and creates a potential dangerous situation for the workers on the ground if the free end of the guide wires accidentally drops from the structure.

GB 2483677 A discloses a guiding system for guiding the wind turbine blades into position on a rotor hub during the assembly process. The guiding system comprises a substantially L-shaped guiding element mounted to a pitch bearing of the rotor hub. The guiding element is configured to engage a socket-shaped element placed on the inner surface of the wind turbine blade adjacent to the bolts facing the rotor hub. The guiding element is arranged on the outer surface of an inner ring of the pitch bearing while the wind turbine blade is bolted to an intermediate ring of the pitch bearing.

This configuration is not a suitable solution for assembling two tower sections, since the mounting interfaces of such tower sections have a very different configuration. The mounting flanges of the tower sections only comprise a single row of holes used for mounting two adjacent tower sections, no secondary row of holes are provided for the guiding element. The mounting flanges of the tower section extend inwards from the inner surface, thus preventing the guiding element from engaging the socket element.

OBJECT OF THE INVENTION

An object of this invention is to provide a guidance device that increases safety for the workers during the assembly of a wind turbine tower.

An object of this invention is to provide a guidance device that guides a tower section into position over another tower section in a simple manner.

An object of the invention is to provide a guidance device that reduces the assembly time.

An object of this invention is to provide a guidance device that allows for assembly of a wind turbine tower at higher wind speeds.

DESCRIPTION OF THE INVENTION

An object of the invention is achieved by a tower assembly system for a wind turbine characterised in that:

at least one guidance device is configured to be coupled to one of the two ends of the tower sections, wherein the guidance device comprises a guiding element connected to mounting means configured to be mounted to the flange of that tower section, which mounting means comprises a third contact surface for contacting a fourth contact surface on the flange facing away from the contact surface of that flange, and wherein the guiding element has a third end which extends out from the end of that tower section when the guidance device is mounted to the flange of that tower section.

This allows the tower sections of the wind turbine tower to be guided into position using a number of mechanical guidance device coupled to the mounting flanges of the lower tower section and/or the upper tower section. As the upper tower section is lowered by the crane, the guiding element mounted to the lower tower section catches the upper tower section and guides it so that it is positioned correctly on the upper end of the lower tower section. The guidance device may instead be mounted on the upper tower section. The mounting means allows the guidance device to be mounted by a worker inside the tower section in a simple and quick manner. The size of the guidance device allows the worker to dismount and repositioned it inside the newly assembled tower section without having to leave the tower section to connect the guidance element to the next tower section. The guidance sections may be mounted to the respective ends of the tower sections on the ground so that the next tower section may be lifted directly into position without first having to reposition the guidance devices. This allows the total assembly time to be reduced by as much as 50% compared to the assembly methods used today. This also increases the safety for the workers, as the worker does not have to stand inside the lower tower section in order to guide the upper tower section into position. After the upper tower section has been guided into position, the workers may enter the wind turbine tower and mount the two tower sections firmly in place using the fastening means, e.g. bolts and nuts. The workers may be positioned inside the lower section in a safe position while the upper section is guided into position and then mount the fastenings means as soon as the upper section is placed in its correct position. This reduces the assembly time.

Three or more guidance devices may be used to more accurately guide the upper tower section into position. The guidance devices may be distributed evenly along the periphery of the end of the tower section to which they are mounted. This allows them to better catch the other tower section and align the two tower sections in the axial direction.

According to one embodiment, the guiding element has a fourth end which is connected to the third end and faces away from the third end, wherein the fourth end comprises a plate having a third contact surface for contacting the inner surface of the tower section when mounted.

This allows the guiding element to be formed as a load transferring structure in the form of a single plate or a grid arrangement of bars or tube. The plate may comprise one or more cut-outs which saves material and weight. The guiding element allows loads derived from the opposite tower section to be transferred to the structure of the tower section to which it is mounted when the two tower sections move relative to each other. This reduces the risk of the two tower sections hitting each other and thus damaging the upper and lower ends of the respective tower sections. The guiding element may be made of steel, iron, aluminium, or another material or composite having high strength capacity.

According to one embodiment, the third end comprises a sixth contact surface for contacting a seventh contact surface of the other tower section, wherein the sixth contact surface forms a convex surface facing the other tower section when mounted.

This allows the area in which the guiding element is able to catch the inner side of the other tower section to be increased as the third end is offset relative to the inner surface of the tower section to which it is mounted. Instead of being mounted to the mounting flange inside the tower section, the guidance device may be fixed to the outside of the tower section, e.g. using fixing means such as a clamping element or the like. This allows the guiding element to catch the outer side of the other tower section. The profile of the outwards extending guiding element may be shaped as a convex element or comprise a convex surface where the radius of the inscribed circle faces the central longitudinal axis of the tower section in which it is mounted. This allows for a more optimal profile of the guiding element so that the movement of the lower end of the free hanging tower section is restricted to a substantially axial movement relative to the upper end of the stationary tower section. This profile prevents the sealant located on the contact surface of the upper end from being scraped off or spread too wide when the lower end is brought into contact with the upper end.

According to one embodiment, the third end comprises a sixth contact surface for contacting a seventh contact surface of the other tower section, wherein the sixth contact surface forms a concave surface facing the other tower section when mounted.

The guiding element may instead be shaped as a concave element or comprise a concave surface where the radius of the inscribed circle faces away from the longitudinal axis of the tower section in which it is mounted. This allows for a profile of the guiding element that enables the swinging or lateral movement of the free hanging tower section due to the wind or vibrations to be dampened as it moves along the guidance device.

The guiding element may be an inverted S-shaped element or comprise an inverted S-shaped surface where the concave part is located at the uppermost part of the guiding element which then changes into the convex part. The guiding element or the contact surface thereof may alternatively extend parallel to the central longitudinal axis of the tower section to which it is attached. The guiding element or the contact surface thereof may alternatively be placed in an oblique angle, e.g. between 0° to 45°, relative to the central longitudinal axis of the tower section to which it is attached. This means that the free hanging tower section does not have to be precisely aligned over the stationary tower section before the guidance device engages the other tower section.

According to one embodiment, the third end extends out from the first or second contact surface of that tower section at a distance of 20 cm to 60 cm.

This allows the guidance device to catch or engage the other tower section at a distance of 20 cm to 60 cm, preferably between 30 cm to 35 cm, from the upper end of the lower tower section. This means that the lateral movement can be controlled during the final state of the lowering process. The guidance device controls the lateral movement of the free hanging tower section so that it is correctly aligned over the stationary tower section.

According to one embodiment, the mounting means is a third flange extending out from the guiding element, wherein the third flange comprises at least one third hole configured to receive second fastening means for mounting to the flange of that tower section.

The mounting flange may be connected to the guiding element at a predetermined position between the two ends. The mounting flange of the guidance device may be brought into contact with the lower side on the mounting flange of the lower tower section and/or the upper side on the mounting flange of the upper tower section. This allows the guidance device to be removed after assembly and reused to assembly the next tower section thus allowing the workers to use only a single set of guidance devices to assembly the entire wind turbine tower.

The mounting flange on the tower section may comprise one or two secondary holes for mounting the guidance device. This allows the upper tower section to be firmly secured to the lower tower section using the primary holes before removing the guidance device. The diameter of the secondary holes may be smaller or equal to the diameter of the primary holes. The flange of the guidance device may be mounted to one or two secondary holes located between two adjacent primary holes on the flange of the lower tower section. The guidance device may be mounted to the tower section using fastening means, such as bolts and nuts, screws, rivets or another suitable fastening means. The secondary hole may comprise a male or female thread arranged on the inside of the hole which is configured to engage a mating thread on a screw or bolt. Instead, the guidance device may be firmly attached to the tower section by welding, gluing or another suitable fastening technique.

According to one embodiment, a second guiding element is connected to the third flange and extends in an axial direction relative to that tower section when mounted, wherein the second guiding element extends through the holes in the flange of that tower section.

The second guiding element in the form of a pin may be connected to the mounting flange of the guidance device. The guidance device is positioned so that the pin extends through one of the primary holes or another secondary hole in the mounting flange of the tower section. This allows the guidance device to also control radial movement of the free hanging tower section. The pin guides the tower section so that the primary holes in the mounting flange are aligned with the mating holes in the mounting flange of the opposite tower section. This ensures that the primary holes are aligned correctly so that the two tower sections can be mounted together using fastening means, such as bolts and nuts, screws, rivets or another suitable fastening means. The pin may comprise a head or free end which has a conical shaped surface for guiding the mating hole into position.

The mounting flange on the guidance device may have a length that is smaller than the length between two adjacent primary holes so that it does not at least partly block the primary holes. The mounting may comprise one or more cut-outs facing the inner surface of the tower section or an adjacent primary hole. This allows the guidance device to be mounted between two of the primary holes. This allows the all of the fastenings means to be mounted to the primary holes before the guidance device is removed. Alternatively if the pin extends through a primary hole the mounting flange may be mounted to a secondary on either sides of that primary hole. The fastenings means may then be mounted to the other primary holes before the guidance device is removed and the fastening means are mounted to that hole.

One or more guidance devices may be mounted to the lower end of the upper tower section where these guidance devices face the guidance devices mounted to the upper end of the lower tower section when the two tower sections are positioned over each other. The guidance devices on both tower sections may have the same configuration and/or may be mounted to the flange in the same manner. The second guiding element may be located on all the guidance devices or only one or more of them. The movement of the lower end of the free hanging tower section may be restricted to a substantially axial movement relative to the upper end of the stationary tower section when the two sets of guidance devices are brought into contact with each other. The guiding elements on two guidance devices facing each other may be offset relative to each other. This allows the free hanging tower section to be moved in a radial direction relative to the stationary tower section so that the primary holes are correctly aligned over each other. This allows the two tower sections to be orientated in the same direction if the guidance devices are mounted at the same or substantially the same position on the tower sections thus allowing any structures (ladders, cable guidance means, or the like) inside the tower sections to be aligned with each other.

According to one embodiment, the third end comprises a conical shaped element extending in an axial direction relative to that tower section when mounted, wherein the guiding element extends through a hole in the flange of that tower section.

The guiding element may be shaped as a guiding pin which extends through one of the primary holes or a secondary hole in the mounting flange of one of the tower sections. The pin may comprise a head or free end which has a conical shaped surface for guiding the mating hole into position. The pin may at the other end be connected to a mounting flange configured to be mounted to the mounting flange of the tower section. A mating primary or secondary hole of the other tower section is then guided along the pin until the lower and upper ends of the two respective tower sections are brought into contact with each other. The guidance device may then be removed and repositioned in another location. The guiding pins and the guiding elements may be used together to guide the upper tower section into the correct position on top of the lower tower section.

The mounting flange of the guiding pin may be connected to a second guiding element having an end which extends out from the end of that tower section when the guidance device is mounted to the flange of that tower section. The end of the second guiding element may have the same configuration as that corresponding end of the other guiding element or a different configuration. This allows the second guiding element to be used to control the radial movement of the free hanging tower section by bringing it into contact with another guidance device so that the movement of the free hanging tower section is restricted to a substantially axial movement.

The guiding pin and/or the second guiding element may extend out from the upper or lower surface of the tower section at a distance of 10 cm to 40 cm, preferably 20 cm to 30 cm. The contact surface may be placed in an oblique angle, e.g. between 0° to 45°, relative to the longitudinal axis of the guiding pin. The guiding pin and/or the second guiding element may be made of the same material as the guiding element.

An object of the invention is also achieved by a method of assembling a wind turbine tower characterised in that
    the first tower section is brought into contact with at least one guidance device coupled to the second tower section in a second position located above the second upper end when the first tower section is moved in at least a lateral direction relative to the second tower section, and
    wherein the guidance device guides the first tower section from the second position to the position where the first lower end rests on the second upper end.

This allows the tower sections to be aligned using a number of mechanical guidance device coupled to the mounting flanges of the lower tower section and/or the upper tower section. As the free hanging upper tower section is lowered, it is caught and guided into the correct position by the guidance devices. The structure of the guidance devices allows one worker to mount the guidance devices inside the tower section in a simple manner. After assembly the worker can dismount and reposition the guidance device on the newly assembled tower section without having to leave the wind turbine tower for connecting the guidance devices to the next tower section. The guidance devices may be pre-mounted to the tower sections before they are lifted up. This allows the total assembly time to be reduced by as much as 50% compared to the assembly methods used today. As the workers do not have to pull or push the free hanging tower section into position from inside of the stationary tower section, the safety for the workers can be increased. The workers can guide the upper tower into position from the ground using two or more guide wires connected to the upper tower section and only have to enter the wind turbine tower when the two tower sections have been brought into contact with each other. The workers may be instead stand inside the lower section in a safe position and mount the fastenings means to the mounting flanges when the lower end rests on the upper end.

According to one embodiment, one end of one of the two tower sections is brought into contact with at least a second guidance device coupled to the other tower section in a third position located above the second upper end when the first tower section is moved in at least a radial direction relative to the second tower section.

One or more guiding pins, preferably at least three, may be used to guide the holes in the mounting flanges of the two tower sections into position. The primary holes on the free hanging tower section may be aligned with the mating holes on the stationary tower section by guiding a contact surface on the opposite tower section along a conical shaped contact surface on the guiding pin. A pin located on the guidance device may be used instead to align the primary holes on the mounting flanges. One or more guiding elements, preferably at least three, may be mounted to the same tower section or to the opposite tower section for controlling the lateral movement of the free hanging tower section. This allows the worker to guide the free hanging tower section into the correct position in a quick and simple manner without having to stand inside the lower tower section.

According to one embodiment, the maximum movement of the first tower section relative to the second tower section is continuously decreased as the first lower end is moved along at least one of the guidance devices.

The contact surfaces on the guidance devices may be placed in an oblique angle, e.g. between 0° to 45°, relative to the central longitudinal axis of the tower section to which they are mounted. The guiding element or the contact surface thereof may instead have a concave and/or convex shape. The contact surfaces on the guidance devices may be placed parallel to the central longitudinal axis of the tower section to which they are mounted. By optimising the profiles of the guidance devices allows the radial and lateral movement as well as the swinging of the free hanging tower section to be controlled as it is lowered. This prevents the two tower section from hitting each other during the lowering process and provides for a proper seal between the two tower sections.

The maximal lateral movement of the free hanging tower section relative to the stationary tower section may be 10 cm or less, preferably 5 cm or less, or even 3 cm or less. The maximal lateral movement may be measured between the contact of the guidance device and the contact surface of the other tower section at a distance of 10 cm or less, preferably 5 cm or less, from the upper end of the lower tower section.

According to one embodiment, the assembling of the wind turbine tower is done in mean wind speeds up to 15 m/s.

The use of mechanical guidance devices to guide the free hanging tower section into position on the stationary tower section allows the assembly process to be carried out in mean wind speeds up to 15 m/s or more. The assembly methods used today only allow the assembly process to be carried out in mean wind speeds up to 10 m/s, particularly at offshore installation sites.

An object of the invention is also achieved by a wind turbine characterised in that the wind turbine tower is assembled according to the method or the tower assembly system defined above.

The guidance device may advantageously be used to install an onshore or offshore wind turbine according to the assembly method. This allows the installation costs to be reduced.

DESCRIPTION OF THE DRAWING

The invention is described by example only and with reference to the drawings, wherein.

In the following text, the figures will be described one by one and the different parts and positions seen in the figures will be numbered with the same numbers in the different figures. Not all parts and positions indicated in a specific figure will necessarily be discussed together with that figure.

DETAILED DESCRIPTION OF THE INVENTION

Figure 1:
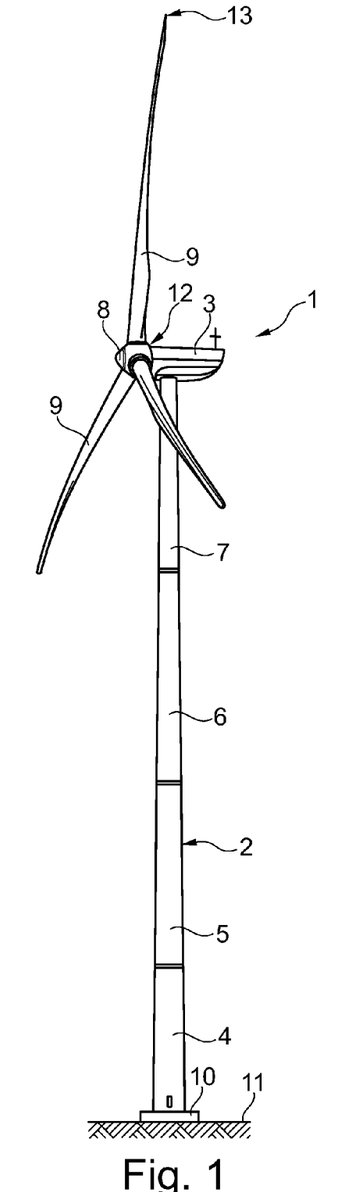
FIG. 1 shows an exemplary embodiment of a wind turbine with a wind turbine tower having multiple tower section.

FIG. 1 shows an exemplary embodiment of a wind turbine 1 with a wind turbine tower 2 and a nacelle 3 mounted at top of the wind turbine tower 2. The wind turbine tower 2 may comprise two or more tower sections 4, 5, 6, 7 mounted on top of each other. A rotatable rotor hub 8 may be mounted to the nacelle 3 via a rotor shaft (not shown). Two or more wind turbine blades 9 may be mounted to the rotor hub 8 via a shaft extending outwards from the centre of the rotor hub 8. The wind turbine blades 9 thus form a rotation plane. The wind turbine tower 2 may be mounted onto a foundation 10 extending above a ground level 11.

The wind turbine blade 9 may comprise a blade root 12 configured to be mounted to the rotor hub 8. The wind turbine blade 9 may comprise a tip end 13 arranged at the free end of the blade 9. The wind turbine blade 9 has an aerodynamic profile along the length of the blade.

Figure 2:
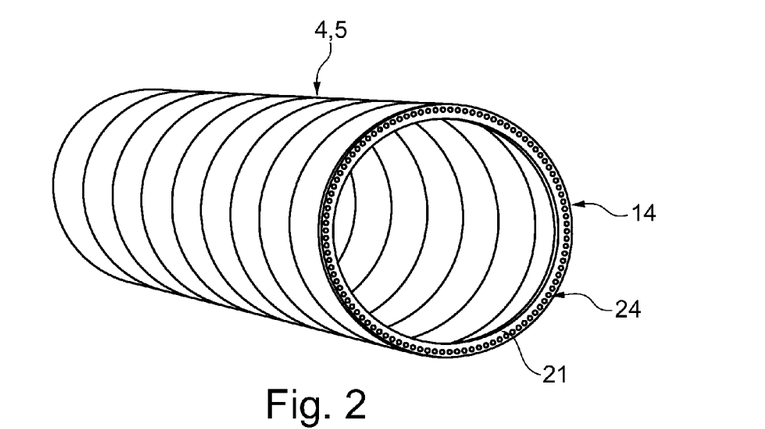
FIG. 2 shows an exemplary embodiment of a tower section shown in FIG. 1.

FIG. 2 shows an exemplary embodiment of one of the tower sections 4, 5, 6, 7 that makes up the wind turbine tower 2. Each tower section 4, 5, 6, 7 may have an upper end 14 connected to a lower end 15 facing away from the first upper end 14. The lower end 15 may comprise a flange 16 that extends out from an inner surface 17 of the tower section 4, 5, 6, 7. The flange 16 may comprise an inner contact surface 18 and an outer contact surface 19. A plurality of primary holes 20 may be arranged on the flange 16 for mounting a lower tower section 4, 5, 6, 7 firmly to that tower section 4, 5, 6, 7. The upper end 14 may comprise a flange 21 that extends out from the inner surface 17. The flange 21 may comprise an inner contact surface 22 and an outer contact surface 23. A plurality of primary holes 24 may be arranged on the flange 21 for mounting an upper tower section 4, 5, 6, 7 firmly to that tower section 4, 5, 6, 7.

The tower section 4, 5, 6, 7 may be made of metal, such as iron, steel, glass or organic fibre reinforced plastic or composite or another suitable material or composite. The tower section 4, 5, 6, 7 may comprise a number of cylindrical, square or oval shaped parts that are coupled together to form the tower section 4, 5, 6, 7. Each part may be welded, fused, glued or mounted together using known fastening techniques. Alternatively, the tower section 4, 5, 6, 7 may be formed by a single part.

Figure 3:
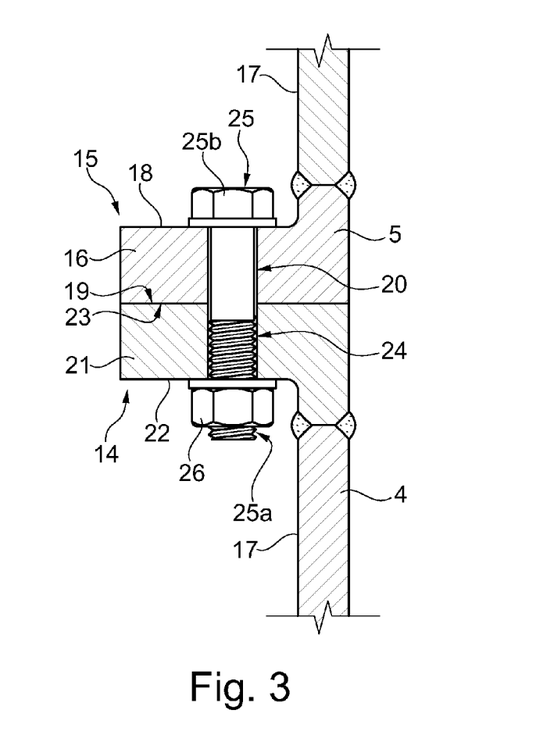
FIG. 3 shows a cross section of two tower sections firmly coupled together.

FIG. 3 shows a cross section of an upper tower section 5 firmly coupled together with a lower tower section 4. The flange 16, 21 may be formed as part of the tower section 4, 5 or be welded, fused, glued or mounted to the end of the tower section 4, 5 using known fastening techniques. The primary holes 20, 24 may extend through the flange 16, 21 and connected to an opening in each of the contact surfaces 18, 19, 22, 23. At least fifty primary holes may be arranged in the flange 16, 21.

The holes 20, 24 may be configured to receive fastening means in the form of bolts 25 and nuts 26. The bolts 25 may comprise a male or female thread 25a configured to engage a mating female or male thread (not shown) in the nuts 26. The bolt 25 may in the other end of the thread 25a comprise a head 25b shaped so that a mounting tool, e.g. a wrench, may engage the head and turn the bolt 25 relative to the nut 26 by applying an external force. The nut 26 may have the same configuration as the bolt head 25b. The bolt 25 may be a M48 bolt or a M68 bolt or any size there in between where the nuts 26 have a mating size. The bolt 25 and nut 26 may be made of a high strength material, such as iron, steel or titanium.

The outer contact surface 19 may face the outer contact surface 23 when the lower end of the upper tower section 5 is aligned over the upper end of the lower tower section 4. A sealant (not shown) in the form of an O-ring or a viscous material may be arranged on the contact surface 23. When the lower end of the tower section 5 rests on the upper end of the tower section 4, the sealant seals the area between two contact surfaces so that water, moisture, dirt or the like is prevented from entering the wind turbine tower 2.

Figure 4:
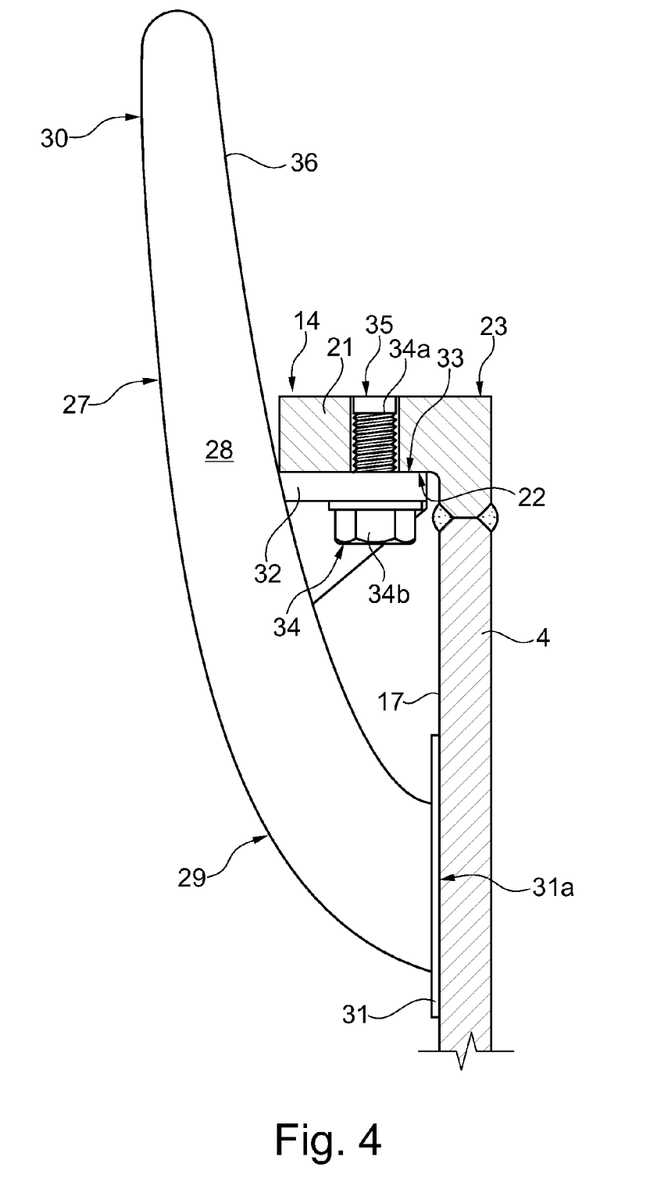
FIG. 4 shows a first exemplary embodiment of a guidance device according to the invention.

FIG. 4 shows a first exemplary embodiment of a guidance device 27 configured to be coupled to the upper end 14 of the tower section 4. The guidance device 27 may additionally or alternatively be coupled to the upper end 14 and/or the lower end 15 of one or more of the tower sections 4, 5, 6, 7. The guidance device 27 may comprise a guiding element 28 having a first end 29 connected to a second end 30 where the second end faces away from the first end 29. The guiding element 28 may be configured as a load transferring structure which may be formed by a single plate. The load transferring structure 28 may be configured to transfer loads derived from the upper tower section 5 into the structure of the lower tower section 4. The guiding element 28 may be made of steel, iron, aluminium, or another material or composite having high strength capacity.

The first end 29 may extend out from the lower contact surface 22 of the flange 21 and face an inner cavity of the tower section 4. The first end 29 may comprise a flange 30 connected to the guiding element 28. The flange 30 may have a contact surface 31 for contacting the inner surface 17 of the lower tower section 4 when mounted.

Mounting means 32 in the form of a flange may be connected to the guiding element 28 between the ends 29, 30 via an intermediate element. The flange 32 may extend out from the guiding element 28 and face toward the inner surface 17 when mounted. The flange 32 may comprise a contact surface 33 for contacting the inner contact surface 22 of the flange 21 when mounted. The flange 32 may comprise one or more secondary holes (not shown) for receiving fastening means in the form of a screw or bolt 34 configured to be mounted to the flange 21. The flange 21 may comprise one or more mating secondary holes 35 for receiving the fastening means 34, preferably one on either side of the intermediate element.

The second end 30 may extend out from the upper contact surface 23 of the flange 21 and face away from the lower tower section 4. The second end 30 may have a convex shape having a contact surface 36 for contacting a contact surface 37 on the upper tower section 5. The contact surface 36 may face towards the flange 21 and may form an inscribed circle where the radius faces away from the central longitudinal axis of the lower tower section 4 when mounted. The profile of the end 30 may be configured to catch and engage the flange 16 of the upper tower section 5 when the lower end 15 of the upper section 5 reaches a first position above the upper end 14 of the lower tower section 4. The end 30 may extend out from the upper contact surface 23 at a distance of 20 cm to 60 cm which defines the first position. This allows the guiding element 28 to substantially restrict the movement of the upper tower section 5 to a substantially lateral movement as the lower end 15 moves along the contact surface 36.

The bolt 34 may comprise a male thread 34*a* configured to engage a mating female thread arranged in the hole 35, or vice versa. The bolt 34 comprises a bolt head 34*b* shaped so that the mounting tool may engage the head 34*b* and turn the bolt 34 relative to the flange 32 by applying an external force. The bolt 34 may be a M10 bolt or a M30 bolt or any size there in between. The bolt 34 may be made of a high strength material, such as iron, steel or titanium.

Figure 5:
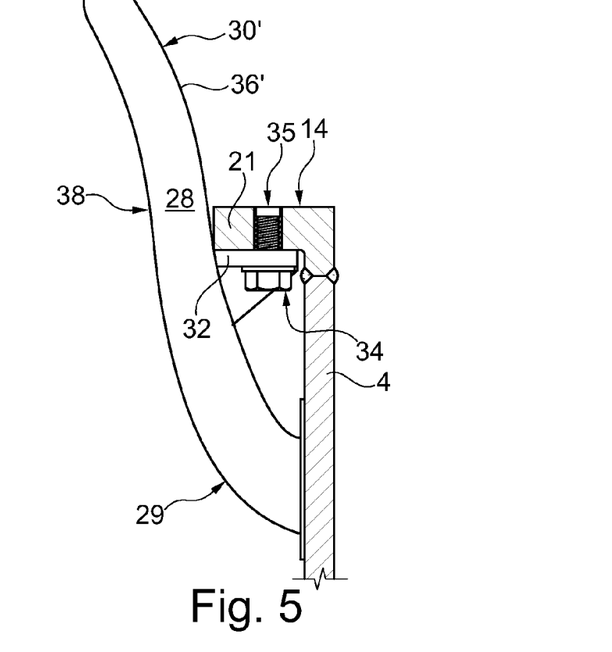
FIG. 5 shows a second exemplary embodiment of the guidance device.

FIG. 5 shows a second exemplary embodiment of the guidance device 38 which differs from the guidance device 27 by having a differently shaped second end 30' of the guiding element 28. The second end 30' may have a concave shape having a contact surface 36' for contacting a contact surface 37 on the upper tower section 5. The contact surface 36' may face towards the flange 21 and may form an inscribed circle where the radius faces toward the central longitudinal axis of the lower tower section 4 when mounted. This allows the guiding element 38 to substantially dampen the swinging or lateral movement of the upper tower section 5 as the lower end 15 moves along the contact surface 36'.

Figure 6:
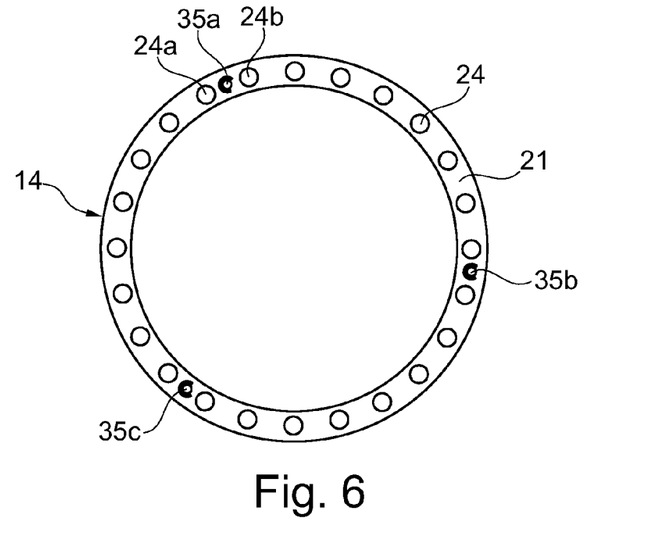
FIG. 6 shows a secondary exemplary embodiment of the upper end of the tower section shown in FIG. 2.

FIG. 6 shows a secondary exemplary embodiment of the upper end 14 of one of the tower sections 4, 5, 6, 7. The flanges 21 may be shaped as a ring where the outer periphery may be coupled to the rest of the tower section 4, 5, 6, 7. The primary holes 24 may be evenly distributed along the flange 21 of the tower section 4, 5, 6, 7 as shown in FIG. 6. Preferably, at least thirty holes 24 may be arranged in the flange 21 where the flange 16 on the lower end 15 may comprise an equal number of primary holes 20.

The secondary hole 35 may be arranged between two adjacent holes 24*a*, 24*b* on the flange 21 so that the guidance device 27, 38 is located between the two adjacent holes 24*a*, 24*b*. At least one secondary hole 35 for receiving the fastening means 34 may be arranged between the two adjacent holes 24*a*, 24*b*. This allows the guidance device 27, 38 to be coupled to the flange 21 so that the lower end 15 and the upper end 14 may be firmly mounted to each other using the fastening means 25, 26 without having to remove the guidance device 27, 38 before mounting the last fastening means 25, 26.

Three or more holes 35*a*, 35*b*, 35*c* may be arranged in the flange 21 for coupling three or more guidance devices 27, 38 to the flange 21 in order to accurately guide the upper tower section 5 into position. The guidance devices 27 may be distributed evenly along the flange 21 of the tower section 4.

Figure 7:
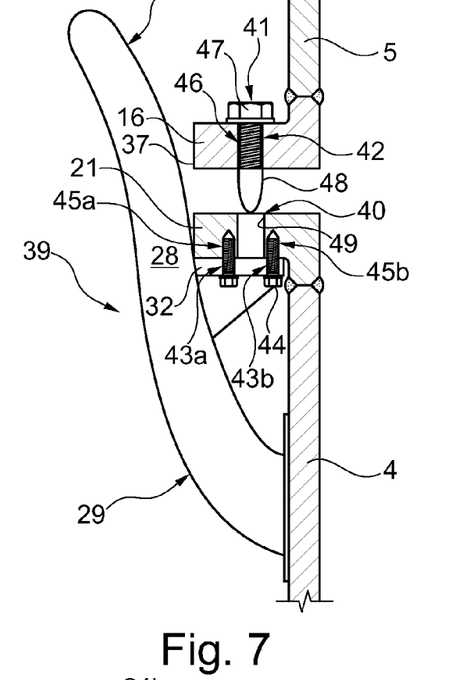
FIG. 7 shows a third exemplary embodiment of the guidance device.

FIG. 7 shows a third exemplary embodiment of the guidance device 39 which differs from the guidance device 38 by comprising another secondary hole 40 arranged in the flange 21. The hole 40 may be configured to receive a second guidance device 41 in the form of a guiding pin which may be coupled to the flange 16 on the upper tower section 4. The flange 16 may comprise another mating secondary hole 42 for receiving the guiding element 41.

The flange 32 of the guidance device 39 may comprise two or more secondary holes 43*a*, 43*b* for receiving fastening means in the form of a screw or bolt 44. The holes 43*a*, 43*b* may be arranged on either side of the hole 40. The flange 21 may comprise two or more mating secondary holes 45*a*, 45*b* for receiving the fastening means 44. The bolts 44 may comprise a male thread configured to engage a mating female thread arranged in the hole 45, or vice versa. The bolt 44 may comprise a bolt head shaped so that the mounting tool may engage the head and turn the bolt 44 relative to the flange 32 by applying an external force. The bolt 44 may be a M5 bolt or a M20 bolt or any size there in between. The bolt 44 may be made of a high strength material, such as iron, steel or titanium.

The second guidance device 41 may comprise a male thread 46 configured to engage a mating female thread arranged in the hole 42, or vice versa. The guidance device 41 may at one end comprise a head 47 shaped as a bolt head, such as the bolt head 34*b*, for engagement with the mounting tool. The guidance device 41 may at the other end comprise a free end having a contact surface 48 for contacting a contact surface 49 arranged in the hole 40. The guidance device 41 may be configured to guide the lower end 15 into position over the upper end 14 so that the primary holes 20, 24 are aligned over each other. This allows the guidance device 41 to substantially restrict the radial movement of the upper tower section 5.

Figure 8:
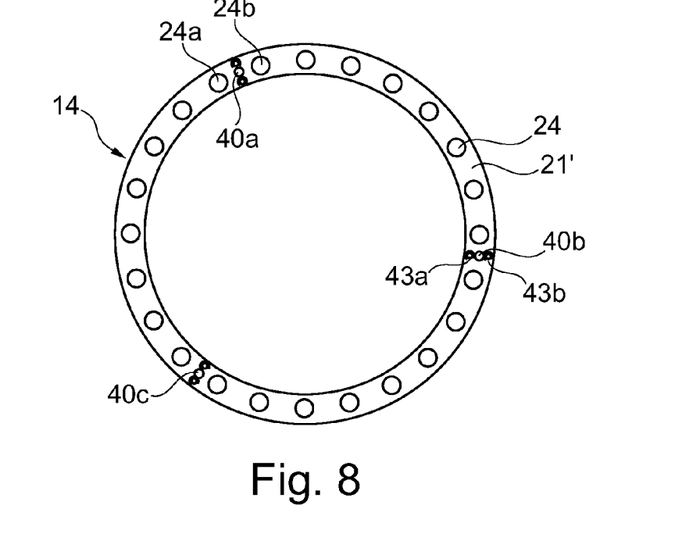
FIG. 8 shows a third exemplary embodiment of the upper end of the tower section shown in FIG. 2.

FIG. 8 shows a third exemplary embodiment of the upper end 14 of one of the tower sections 4, 5, 6, 7. This embodiment differs from the embodiment shown in FIG. 6 in that the secondary hole 40 is arranged between two adjacent primary holes 24*a*, 24*b* on the flange 21'. The holes 43*a*, 43*b* for mounting the guidance device 39 may be arranged between the inner and outer periphery of the flange 21' or between the two adjacent holes 24*a*, 24*b*. This allows the guidance device 39 to be coupled to the flange 21' so that the lower end 15 and the upper end 14 may be firmly mounted to each other using the fastening means 25, 26 without having to remove the guidance device 39 before mounting the last fastening means 25, 26.

Three or more holes 40*a*, 40*b*, 40*c* may be arranged in the flange 21' for coupling three or more guidance devices 39 to the flange 21' in order to accurately guide the upper tower section 5 into position. The guidance devices 39 may be distributed evenly along the flange 21' of the tower section 4.

The secondary hole 42 on the flange 16 may be arranged between two adjacent holes 20 (not shown) and may be aligned over the hole 40, similar to the flange 21 shown in FIG. 6. Three or more guidance device may also be arranged in the flange 16 of the upper tower section 5.

Figure 9:
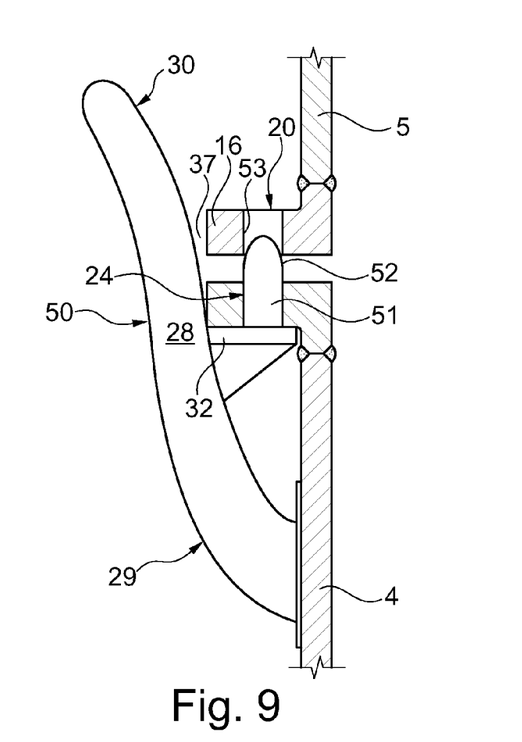
FIG. 9 shows a fourth exemplary embodiment of the guidance device.

FIG. 9 shows a fourth exemplary embodiment of the guidance device 50 which differs from the guidance device 39 by comprising a second guiding element 51 in the form of a guiding pin. The guiding element 51 may be connected to the flange 32 and extend out from the contact surface 33. The guiding element 51 may extend through one of the primary holes 24 and face the lower end 15 of the upper tower section 5.

The guiding element 51 may comprise a free end having a contact surface 52 for contacting a contact surface 53 arranged in a mating primary hole 20 on the flange 16. The guiding element 51 may be configured to guide the lower end 15 into position over the upper end 14 so that the primary holes 20, 24 are aligned over each other. This allows the guiding element 51 to substantially restrict the radial movement of the upper tower section 5.

Figure 10:
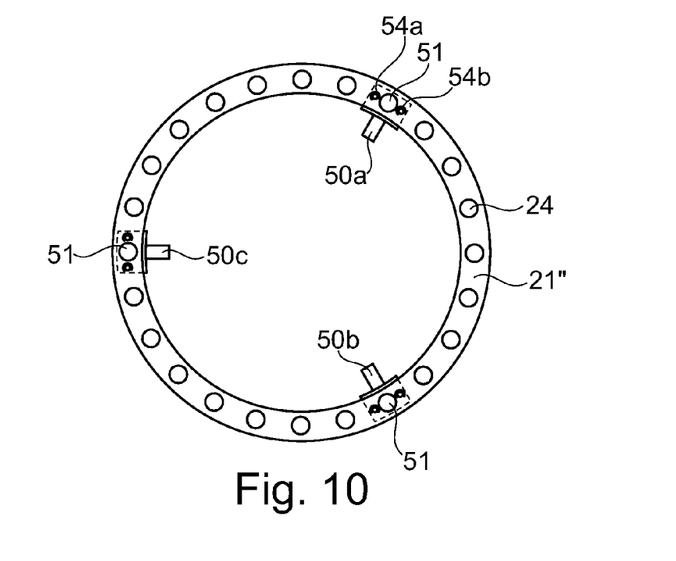
FIG. 10 shows a fourth exemplary embodiment of the upper end of the tower section shown in FIG. 2.

FIG. 10 shows a fourth exemplary embodiment of the upper end 14 of one of the tower sections 4, 5, 6, 7. This embodiment differs from the embodiment shown in FIG. 8 in that the guidance device 50 is coupled to two secondary holes 54*a*, 54*b* arranged on either side of a primary hole 24 on the flange 21". The flange 32 may comprise two mating secondary holes (not shown) for receiving fastening means in the form of a screw or a bolt (not shown). The holes 54 may also be configured to receive the fastening means. The fastening means may comprise a male thread configured to engage a mating female thread arranged in the hole 54, or vice versa. The fastening means may have the same configuration as the fastening means 34, 44.

This allows the guidance device 50 to guide the lower end 15 of the upper tower section 5 in the correct position on the upper end 14 of the lower tower section 4. The fastening 25, 26 may then be mounted to the remaining primary holes 24 so that the two ends 14, 15 are firmly mounted to together. The guidance device 50 may then be removed before mounting the last fastening means 25, 26.

Three or more guidance devices 50a, 50b, 50c may be coupled to the flange 21" in order to accurately guide the upper tower section 5 into position. The guidance devices 50 may be distributed evenly along the flange 21" of the tower section 4.

Figure 11:
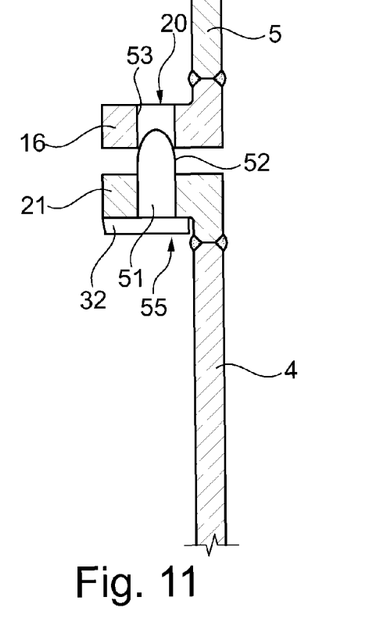
FIG. 11 shows a fifth exemplary embodiment of the guidance device.

FIG. 11 shows a fifth exemplary embodiment of the guidance device 55 which differs from the guidance device 50 in that the guiding element 28 and the intermediate element are omitted. The guidance device 55 is in this embodiment configured as a guiding pin, as shown in FIG. 11. The guidance device 55 may be coupled to the flange 21 as described in FIG. 10.

Figure 12:
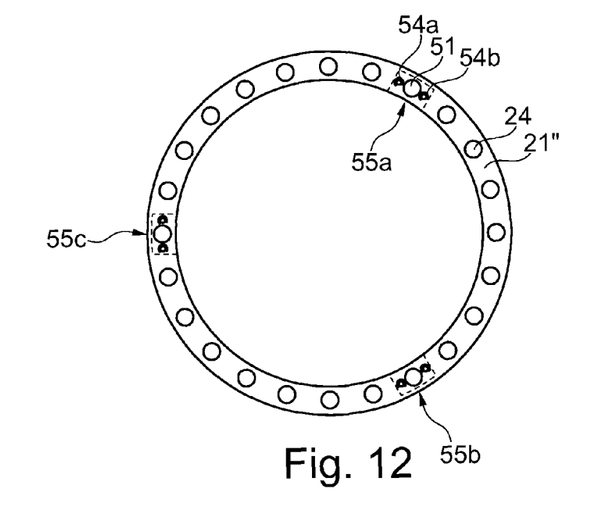
FIG. 12 shows a fifth exemplary embodiment of the upper end of the tower section shown in FIG. 2.

FIG. 12 shows a fifth exemplary embodiment of the upper end 14 of one of the tower sections 4, 5, 6, 7. This embodiment differs from the shown in FIG. 10 in that the guiding element 28 and the intermediate element is omitted from the guidance device 55.

Three or more guidance devices 55a, 55b, 55c may be coupled to the flange 21" in order to guide the upper tower section 5 into position in the radial direction. The guidance devices 55 may be distributed evenly along the flange 21" of the tower section 4.

One or more sets of the guidance devices 27, 38, 39, 50 may be used to catch and control the lateral movement of the upper tower section 5.

The second guiding element 41, 51 may extend out from the contact surface 19, 23 of the flange 16, 21 at a distance of 10 cm to 40 cm, preferably 20 cm to 30 cm which defines a second position. The contact surface 48, 52 may have a conical shape where the surface 48, 52 is placed in an angle, e.g. between 0° to 45°, relative to the longitudinal axis of the guiding element 41, 51. The second guiding element 41, 51 may be made of the same material as the guiding element 28. The profile of the guiding element 41, 51 may be configured to catch and engage the flange 16 of the upper tower section 5 when the lower end 15 reaches the second position above the upper end 14 of the lower tower section 4.

Figure 13:
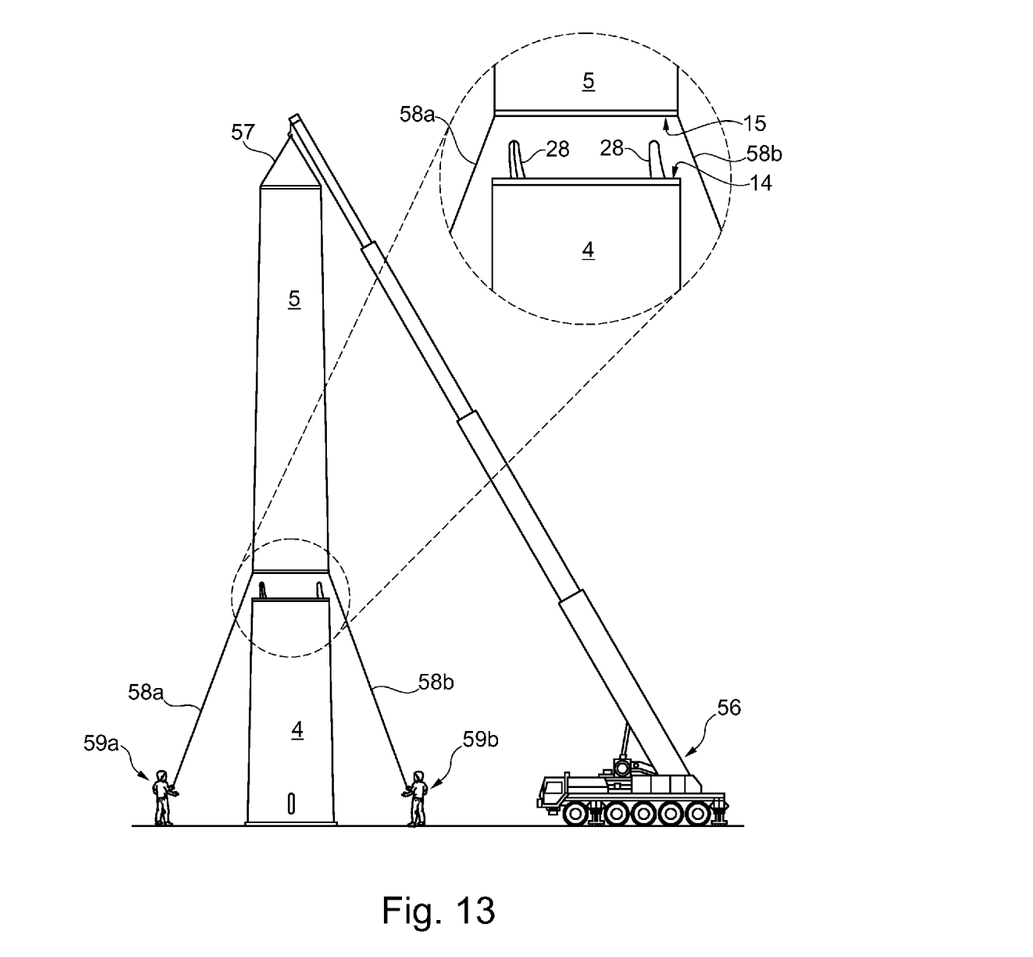
FIG. 13 shows an exemplary method for assembling a wind turbine tower according to the invention.

FIG. 13 shows an exemplary method for assembling a wind turbine tower 2 according to the invention. One or more cranes 56, such as mobile cranes, may be used to lift the tower sections 4, 5, 6, 7 into position on top of each other. Only the lower tower section 4 and the upper tower section 5 is shown.

The crane 56 may comprise a winch (not shown) having a wire 57 coupled to the upper end 14 of the upper tower section 5 for lifting the tower section 5. One or more guide wires 58a, 58b may be coupled to the lower end of the upper tower section 5 where workers 59a, 59b on the ground may use the guide wires 58 to guide the tower section 5 into the correct position. Alternatively a second smaller crane (not shown) may be used to guide the upper tower section 5 into the correct position.

The guidance devices 27, 38, 39, 50 may be coupled to the upper end 14 of the lower tower section 4. The guidance devices 27, 38, 39, 50 may alternatively or additionally be coupled to the lower end 15 and/or the upper end 14 of the upper section 5. The guidance devices 27, 38, 39, 50 may be coupled to the tower sections 4, 5 before the upper tower section 5 is lifted up. A set of three or more guidance devices 27, 38, 39, 50 may be coupled to the lower tower section 4, as shown in FIG. 13, for accurately guiding the upper tower section 5 into position on the lower tower section 4. Another set of three or more guidance devices 41, 55 may be additionally or alternatively coupled to the upper tower section 5 and/or the lower tower section 4.

The upper tower section 5 may then be lifted upward in at least an axial direction relative to the lower tower section 4 so that the lower end 15 of the upper tower section 5 is positioned above the upper end 14 of the lower tower section. The upper tower section 5 may then be rotated and substantially aligned relative to the lower tower section 4 in the axial direction so that the lower end 15 is substantially positioned above the upper end 14. The upper tower section 5 may then be lowered in a substantially axial direction toward the lower tower section 4.

The guiding elements 28 on the guidance devices 27, 38, 39, 50 may then catch the lower end 15 of the upper tower section 5 in the first position above the upper end 14 as the upper tower section 5 is lowered. The workers 59 may use the guide wires 58 to guide the upper tower section 5 in an axial direction relative to the guiding element 28 as the contact surfaces 36, 37 of the two units are brought into contact with each other when the upper tower section 5 moves in a lateral direction relative to the lower tower section 4. The guiding element 28 controls the lateral movement of the upper tower section 5 as it is lowered further towards the upper end 14 of the lower tower section 4.

The maximum lateral movement of the upper tower section 5 relative to the lower tower section 4 may be continuously decreased as the lower end 15 is moved from the first position and towards the upper end 14 along the guiding element 28. The contact surface 37 of the flange 16 may be brought into contact with the contact surface 36 of the guiding element 28 as the upper tower section 5 is moved along the guidance device 27, 38, 39, 50. The maximal lateral movement of the upper tower section 5 relative to the lower tower section 4 may be 10 cm or less, preferably 5 cm or less, or even 3 cm or less. The lateral movement may be measured between the contact surface 36 of the guiding element 28 and the contact surface 37 of the upper tower section 5 at a distance of 10 cm or less, preferably 5 cm or less, from the upper end 14 of the lower tower section 4.

The second guiding element 41, 55 located on the upper tower section 5 and/or the lower tower section 4 may then catch the lower end 15 of the upper tower section 5 in the second position above the lower end 14. The workers 59 may use the guide wires 58 to guide the upper tower section 5 in an radial direction relative to the guiding element 28 so that the contact surface 49, 53 on the holes 40, 20 of the upper tower section 5 are brought into contact with the contact surfaces 48, 52 of the guidance device 39, 50, 55 as the upper tower section 5 moves in a radial direction relative to the lower tower section 4. The guidance devices 39, 50, 55 control the radial movement of the upper tower section 5 as it is lowered until the upper end 14 rests on the lower tower section 4.

A worker inside the lower tower section 4 may then mount the fastening means 25, 26 to the flanges 16, 21 so that the two tower sections 4, 5 are firmly attached to each other. The wire from the crane 57 and the guidance wires 58 may then be removed and coupled to the next tower section 6. The worker inside the tower section 4 may remove the guidance devices 27, 38, 39, 50, 55 and reposition them on the upper end 14 on the upper tower section 5 if a second set of guidance devices are not already coupled to that end.

The guidance devices 27, 38, 39, 50, 55 allows the tower sections 4, 5, 6, 7 to be assembled in mean wind speeds up to 15 m/s. They further allow the workers 59 to assembly the tower sections 4, 5, 6, 7 up to 50% faster than with any other conventional assembly method. The guidance devices 27, 38, 39, 50, 55 may be used to assemble a wind turbine tower 2 at an offshore installation site.

The invention claimed is:

1. A tower assembly system for a wind turbine, where the system comprises:
    a first tower section having a first upper end connected to a first lower end facing away from the first upper end, wherein the first lower end comprises a first flange having multiple first holes configured to receive fastening means for mounting to a second tower section, and comprises a first contact surface for contacting a second contact surface on the second tower section;
    the second tower section having a second upper end connected to a second lower end facing away from the second upper end, wherein the second upper end comprises the second contact surface and a second flange having multiple second holes configured to receive the fastening means;
    wherein at least one guidance device is configured to be coupled to one of the two ends of the tower sections, wherein the guidance device comprises a guiding element connected to mounting means configured to be mounted to the flange of that tower section, which mounting means comprises a third contact surface for contacting a fourth contact surface on the flange facing away from the contact surface of that flange, and wherein the guiding element has a third end and a fourth end where the third end extends out from the end of that tower section when the guidance device is mounted to the flange of that tower section; and
    wherein the fourth end is connected to the third end and faces away from the third end, and further wherein the fourth end comprises a plate having a fifth contact surface for contacting the inner surface of the tower section when mounted.

2. A tower assembly system according to claim 1, wherein the third end comprises a sixth contact surface for contacting a seventh contact surface of the other tower section, wherein the sixth contact surface forms a convex surface facing the other tower section when mounted.

3. A tower assembly system according to claim 1, wherein the third end comprises a sixth contact surface for contacting a seventh contact surface of the other tower section, wherein the sixth contact surface forms a concave surface facing the other tower section when mounted.

4. A tower assembly system according to claim 1, wherein the third end extends out from the first or second contact surface of that tower section at a distance of 20 cm to 60 cm.

5. A tower assembly system according to claim 1, wherein the mounting means is a third flange extending out from the guiding element, wherein the third flange comprises at least one third hole configured to receive second fastening means for mounting to the flange of that tower section.

6. A tower assembly system for a wind turbine comprising:
    a first tower section having a first upper end connected to a first lower end facing away from the first upper end, wherein the first lower end comprises a first flange having multiple first holes configured to receive fastening means for mounting to a second tower section, and comprises a first contact surface for contacting a second contact surface on the second tower section;
    the second tower section having a second upper end connected to a second lower end facing away from the second upper end, wherein the second upper end comprises the second contact surface and a second flange having multiple second holes configured to receive the fastening means;
    wherein at least one guidance device is configured to be coupled to one of the two ends of the tower sections, wherein the guidance device comprises a guiding element connected to mounting means configured to be mounted to the flange of that tower section, which mounting means comprises a third contact surface for contacting a fourth contact surface on the flange facing away from the contact surface of that flange, and wherein the guiding element has a third end which extends out from the end of that tower section when the guidance device is mounted to the flange of that tower section;
    wherein the mounting means is a third flange extending out from the guiding element, wherein the third flange comprises at least one third hole configured to receive second fastening means for mounting to the flange of that tower section; and
    wherein a second guiding element is connected to the third flange and extends in an axial direction relative to that tower section when mounted, wherein the second guiding element extends through the holes in the flange of that tower section.

7. A tower assembly system according to claim 1, wherein the third end comprises a conical shaped element extending in an axial direction relative to that tower section when mounted, wherein the guiding element extends through a hole in the flange of that tower section.

* * * * *